(12) United States Patent
Chiang

(10) Patent No.: US 10,993,188 B2
(45) Date of Patent: Apr. 27, 2021

(54) ELECTRONIC DEVICE AND CONTROL METHOD THEREOF

(71) Applicant: ASUSTeK COMPUTER INC., Taipei (TW)

(72) Inventor: Kun-Hsin Chiang, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 16/819,304

(22) Filed: Mar. 16, 2020

(65) Prior Publication Data

US 2020/0314746 A1    Oct. 1, 2020

(30) Foreign Application Priority Data

Mar. 29, 2019    (TW) .................................. 108111400

(51) Int. Cl.
| | |
|---|---|
| *G06F 1/00* | (2006.01) |
| *H04W 52/02* | (2009.01) |
| *G06F 9/451* | (2018.01) |
| *G09G 5/00* | (2006.01) |
| *H04M 1/72454* | (2021.01) |

(52) U.S. Cl.
CPC .......... *H04W 52/027* (2013.01); *G06F 9/451* (2018.02); *G09G 5/003* (2013.01); *H04M 1/72454* (2021.01); *H04M 2250/12* (2013.01)

(58) Field of Classification Search
None
See application file for complete search history.

(56) References Cited

U.S. PATENT DOCUMENTS

| | | | |
|---|---|---|---|
| 2018/0212060 A1* | 7/2018 | Kang | ................... H01L 51/5234 |
| 2019/0056775 A1* | 2/2019 | Chung | ................... G06F 1/3287 |
| 2020/0074956 A1 | 3/2020 | Zhou | |

FOREIGN PATENT DOCUMENTS

| | | |
|---|---|---|
| CN | 107102864 A | 8/2017 |
| CN | 108418953 A | 8/2018 |

* cited by examiner

*Primary Examiner* — Michael A Faragalla
(74) *Attorney, Agent, or Firm* — McClure, Qualey & Rodack, LLP

(57) ABSTRACT

An electronic device and a control method applied to the electronic device are disclosed. The control method includes the following steps: receiving a feedback signal and determining a signal strength value of the feedback signal; comparing the signal strength value with a threshold value; obtaining a gravity acceleration value from a gravity sensor and comparing the gravity acceleration value with a predetermined value when the signal strength value is greater than the threshold value; comparing a variation value of the gravity acceleration value with a variation threshold value when the gravity acceleration value is greater than the predetermined value; and controlling a screen to operate in a first mode when the variation value is greater than the variation threshold value.

9 Claims, 3 Drawing Sheets

ELECTRONIC DEVICE AND CONTROL METHOD THEREOF

CROSS-REFERENCE TO RELATED APPLICATION

This application claims the priority benefit of Taiwan application serial No. 108111400, filed on Mar. 29, 2019. The entirety of the above-mentioned patent application is hereby incorporated by reference herein and made a part of the specification.

BACKGROUND OF THE INVENTION

Field of the Invention

The disclosure relates to an electronic device and a control method thereof.

Description of the Related Art

In a general process of a mobile phone call, when a screen is close to a user's cheek, the screen darkens to save power. However, if a foreign matter and an oil stain adhere to the screen, the mobile phone screen is abnormally bright and dark, consequently affecting user's subsequent use.

BRIEF SUMMARY OF THE INVENTION

According to the first aspect, an electronic device is provided. The electronic device includes a screen, a distance sensor, a gravity sensor, a memory, and a processor. The distance sensor is configured to transmit an acknowledgement signal and receive a feedback signal responding to the acknowledgement signal. The gravity sensor is configured to detect a gravity acceleration value. The memory is configured to store at least one program instruction, a threshold value, a variation threshold value, and a predetermined value. The processor is electrically connected to the distance sensor, the gravity sensor, and the memory, and loading the at least one program instruction to perform the following steps: receiving the feedback signal from the distance sensor; determining a signal strength value of the feedback signal; comparing the signal strength value with the threshold value obtained from the memory; comparing the gravity acceleration value obtained from the gravity sensor with the predetermined value obtained from the memory when the signal strength value is greater than the threshold value; comparing a variation value of the gravity acceleration value with the variation threshold value obtained from the memory when the gravity acceleration value is greater than the predetermined value; and controlling the screen to operate in a first mode when the variation value is greater than the variation threshold value.

According to the second aspect, a control method applied to an electronic device with a screen, a memory, and a gravity sensor, wherein the memory is configured to store a threshold value, a predetermined value, and a variation threshold value, the gravity sensor is configured to detect a gravity acceleration value, and the control method comprises: receiving a feedback signal; determining a signal strength value of the feedback signal; comparing the signal strength value with the threshold value obtained from the memory; comparing the gravity acceleration value obtained from the gravity sensor with the predetermined value obtained from the memory when the signal strength value is greater than the threshold value; comparing a variation value of the gravity acceleration value with the variation threshold value obtained from the memory when the gravity acceleration value is greater than the predetermined value; and controlling the screen to operate in a first mode when the variation value is greater than the variation threshold value.

In conclusion, the control method for the electronic device and the screen provided in the embodiments of the disclosure avoid abnormal display caused by a foreign matter or an oil stain on the screen, so that the electronic device maintains a correct display behavior.

BRIEF DESCRIPTION OF THE DRAWINGS

The description of the drawings in the disclosure is as follows.

DETAILED DESCRIPTION OF THE EMBODIMENTS

Figure 1:
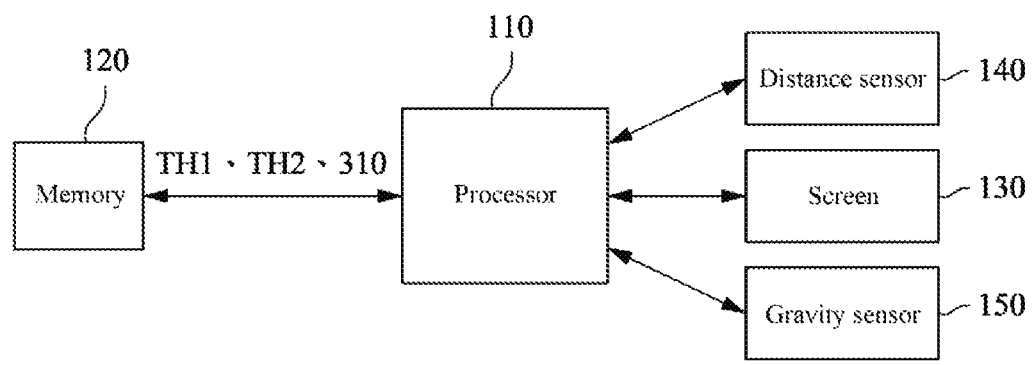
FIG. 1 is a schematic diagram of an electronic device according to some embodiments of the disclosure.

An element, when referred to as "connected" or "coupled" to another element, may be directly connected or coupled to another element, or an additional element exists. Correspondingly, when an element is referred to as "directly connected" or "directly coupled" to another element, there is no additional element.

A plurality of embodiments of the disclosure will be disclosed below in the accompanying drawings, and for the clarity of illustration, numerous practical details will be set forth in the following description. It should be understood, however, that these practical details are not intended to limit the disclosure. That is, in some embodiments of the disclosure, such practical details are unnecessary. In addition, some well-known and customary structures and elements will be shown in the drawings in a simple schematic manner for the sake of simplifying the drawings.

FIG. 1 is a schematic diagram of an electronic device 100 according to some embodiments of the disclosure. In different applications, the electronic device 100 is a device such as a mobile phone, a tablet computer, a personal computer, a notebook computer, and the like. In an embodiment, the electronic device 100 is a smart phone to facilitate call applications.

The electronic device 100 includes a processor 110, a memory 120, a screen 130, a distance sensor 140, and a gravity sensor 150. The processor 110 is coupled to the memory 120, the screen 130, the distance sensor 140, and the gravity sensor 150. In various embodiments, the processor 110 is a central processing unit (CPU), an application-specific integrated circuit (ASIC), a multiprocessor, a distributed processing system, or an appropriate processing circuit.

In some embodiments, the memory 120 stores at least one program instruction, so that the processor 110 executes the program instruction to perform a screen display adjustment function. In some embodiments, the at least one program instruction is obtained by encoding a plurality of instruction sets, so that the processor 110 performs a plurality of steps in the following FIG. 4.

In some embodiments, the memory 120 is a non-transient computer-readable media storage medium. In some embodiments, the computer-readable storage medium is an electronic, a magnetic, an optical, an infrared, and/or a semiconductor system (or equipment or device). In an embodiment, the computer-readable storage medium includes a semiconductor or a solid state memory, a magnetic tape, a removable computer magnetic disk, a random access memory (RAM), a read-only memory (ROM), a hard magnetic disk, and/or an optical magnetic disk. In one or more embodiments in which an optical magnetic disk is used, the computer-readable storage medium includes a compact disc read-only memory (CD-ROM), a rewritable compact disc (CD-R/W) and/or a digital versatile disc (DVD).

In some embodiments, the screen 130 displays a picture based on control of the processor 110. The picture includes a step menu provided by a system, content provided by various application programs, and the like. In some embodiments, the screen 130 is a touch control screen.

In some embodiments, the electronic device 100 further includes a circuit element such as a video card (not shown) or an audio and video processing circuit (not shown). The circuit element provides, based on control of the processor 110, the processed image data to the screen 130 for display. In some embodiments, the distance sensor 140 is disposed corresponding to the screen 130, to detect a call usage state of the electronic device 100. In an embodiment, since an earpiece is disposed in a peripheral area of the screen 130, the distance sensor 140 is disposed in the peripheral area, or is disposed below a transparent area of the screen 130. In this way, under normal conditions, when the electronic device 100 is held by a user close to a face for a call, the distance sensor 140 determines that an object (which is the face of the user in an embodiment) appears within a certain distance ahead of the electronic device 100, and then controls the screen 130 to turn off a screen light source to save power.

In an embodiment, when the electronic device 100 is held close to an ear for a call, the face or ear of the user touches the screen 130, which causes foreign matter such as oil stain to adhere to the screen 130. In this case, even the electronic device 100 is used hands-free, such as a speaker, or is placed flat on a table, the screen 130 still turns off the light source, which causes inconvenience for user operations. To prevent the foregoing situation, the processor 110 determines a current state of the electronic device 100 according to a signal strength value detected by the distance sensor 140 disposed in the screen 130 and a current gravity acceleration value detected by a gravity sensor 150 disposed in the electronic device 100.

In an embodiment, the gravity sensor 150 detects the current gravity acceleration value of the electronic device 100, so that the processor 110 determines the current state of the electronic device 100. In an embodiment, the gravity sensor 150 includes an accelerometer (not drawn) and a gyroscope (not drawn). In an embodiment, the accelerometer detects the current speed information and the current displacement information of the electronic device 100. The gyroscope is configured to detect a current azimuth angle of the electronic device 100. In this way, the gravity sensor 150 generates the gravity acceleration value of the electronic device 100 according to the detected speed information, displacement information, and azimuth angle, so that the processor 110 determines the current state of the electronic device 100.

In this way, when the user uses the electronic device 100, the processor 110 adjusts luminance or an operation mode of the screen 130 according to the signal strength value detected by the distance sensor 140 and the gravity acceleration value detected by the gravity sensor 150. Therefore, the screen 130 is prevented from being incorrectly bright and dark due to foreign matter.

Figure 2:
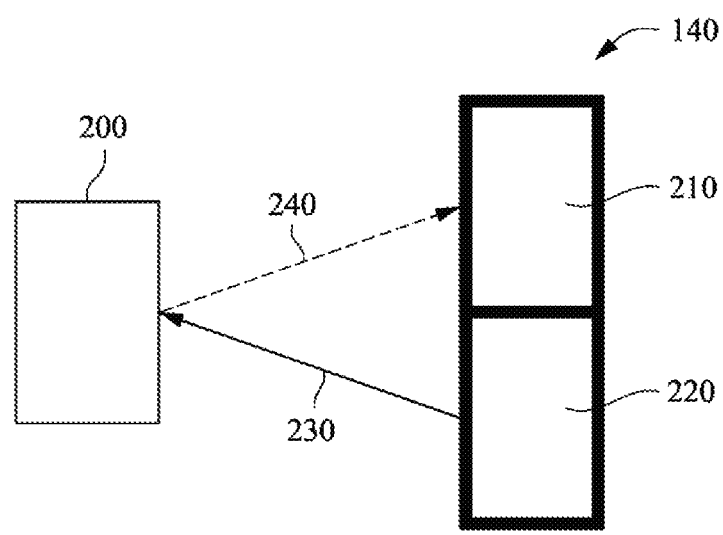
FIG. 2 is a schematic diagram of disposing a distance sensor according to some embodiments of the disclosure.

FIG. 2 is a schematic diagram of disposing a distance sensor 140 according to some embodiments of the disclosure. In some embodiments, the distance sensor 140 includes a receiver 210 and a transmitter 220. The transmitter 220 is configured to transmit an acknowledgement signal 230 along a direction. In this embodiment, the transmitter 220 is an infrared transmitter, and the acknowledgement signal 230 is an infrared signal. When the acknowledgement signal 230 is transmitted to an object 200, the object 200 generates a feedback signal 240 responding to the acknowledgement signal 230 and transmits the feedback signal 240 to the receiver 210. The receiver 210 receives the feedback signal 240 and transmits the feedback signal 240 to the processor 110. The processor 110 determines a signal strength value of the feedback signal 240, and determines a distance between the electronic device 100 and the object 200 according to the signal strength value.

In some embodiments, a larger signal strength value of the feedback signal 240 indicates that the object 200 is closer to the electronic device 100; and on the contrary, a smaller signal strength value of the feedback signal 240 indicates a longer distance between the object 200 and the distance sensor 140.

In an embodiment, the memory 120 in FIG. 1 stores a threshold value TH1. When the signal strength value of the feedback signal 240 is greater than the threshold value TH1, the processor 110 determines that there is an object approaching the distance sensor 140, and enables the gravity sensor 150 to detect the current gravity acceleration value of the electronic device 100.

Figure 3:
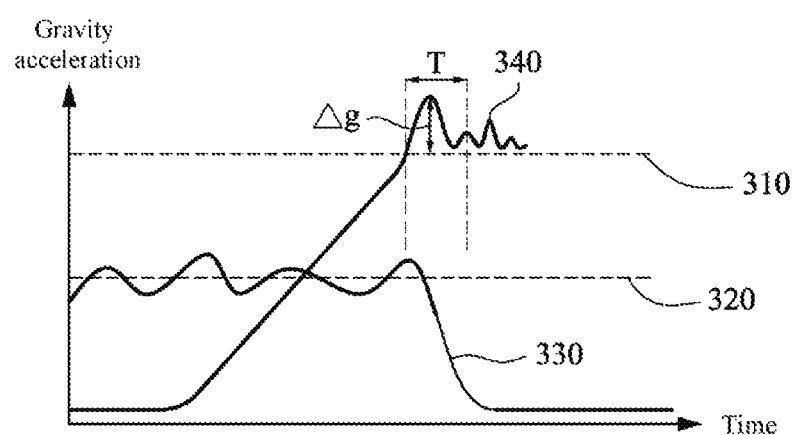
FIG. 3 is a schematic diagram of a relationship between an operation gesture and a gravity acceleration according to some embodiments of the disclosure.

FIG. 3 is a schematic diagram of a relationship between an operation situation and a gravity acceleration of the electronic device 100 in FIG. 1 according to some embodiments of the disclosure. In FIG. 3, a longitudinal axis unit is a gravity acceleration value, and a horizontal axis unit is time. In some embodiments, the memory 120 in FIG. 1 stores a predetermined value 310 shown in FIG. 3. As shown in FIG. 3, the predetermined value 310 is greater than a gravity acceleration value 320. In some embodiments, the gravity acceleration value 320 is a gravity acceleration value of the electronic device 100 in general using state (for example, the gravity acceleration value 320 is 0.5 g), but the disclosure is not limited thereto. In an embodiment, the general using state does not include a state in which the user holds up the electronic device 100 to make a call (that is, a state in which the electronic device 100 is upright). In an embodiment, when the signal strength value of the feedback signal 240 is greater than the threshold value TH1, the processor 110 further compares the gravity acceleration value detected by the gravity sensor 150 with the predetermined value 310, to determine whether the electronic device 100 is held up by the user for a call. If not, it is determined that there is possibly foreign matter on the screen 130.

In an embodiment, as shown in FIG. 3, a curve 330 indicates a gravity acceleration state curve generated when the electronic device 100 is in a general usage state. In some embodiments, as shown by the curve 330, when the electronic device 100 is obliquely fixed on a table by the user to be viewed or used continuously, the gravity acceleration value of the electronic device 100 varies steadily around a second gravity acceleration value 320. Then, when the user places the electronic device 100 in a plat plane, the gravity acceleration value of the electronic device 100 approaches 0 and in a stable state. The foregoing usage situation corresponding to the curve 330 is used as an embodiment, and the disclosure is not limited thereto.

In an embodiment, as shown in FIG. 3, a curve 340 is a gravity acceleration state curve of the electronic device 100 from the moment that the electronic device 100 is not used to other moment that the electronic device 100 is held to make a call (from a flat state to an upright state). In an embodiment, when the user intends to make a call, the electronic device 100 is held up and moved close to the face or ear of the user to make a call. In this case, because the screen 130 is close to the face or ear of the user, the signal strength value of the feedback signal 240 is greater than the threshold value TH1. In addition, as shown by the curve 340, the gravity acceleration value of the electronic device 100 significantly increases. When the gravity acceleration value is greater than the predetermined value 310 and a variation value Δg of the gravity acceleration value detected within a subsequent continuous time interval is greater than a variation threshold value TH2, the processor 110 determines that the screen 130 is close to the object (which is the face or ear of the user in an embodiment) at this time.

Figure 4:
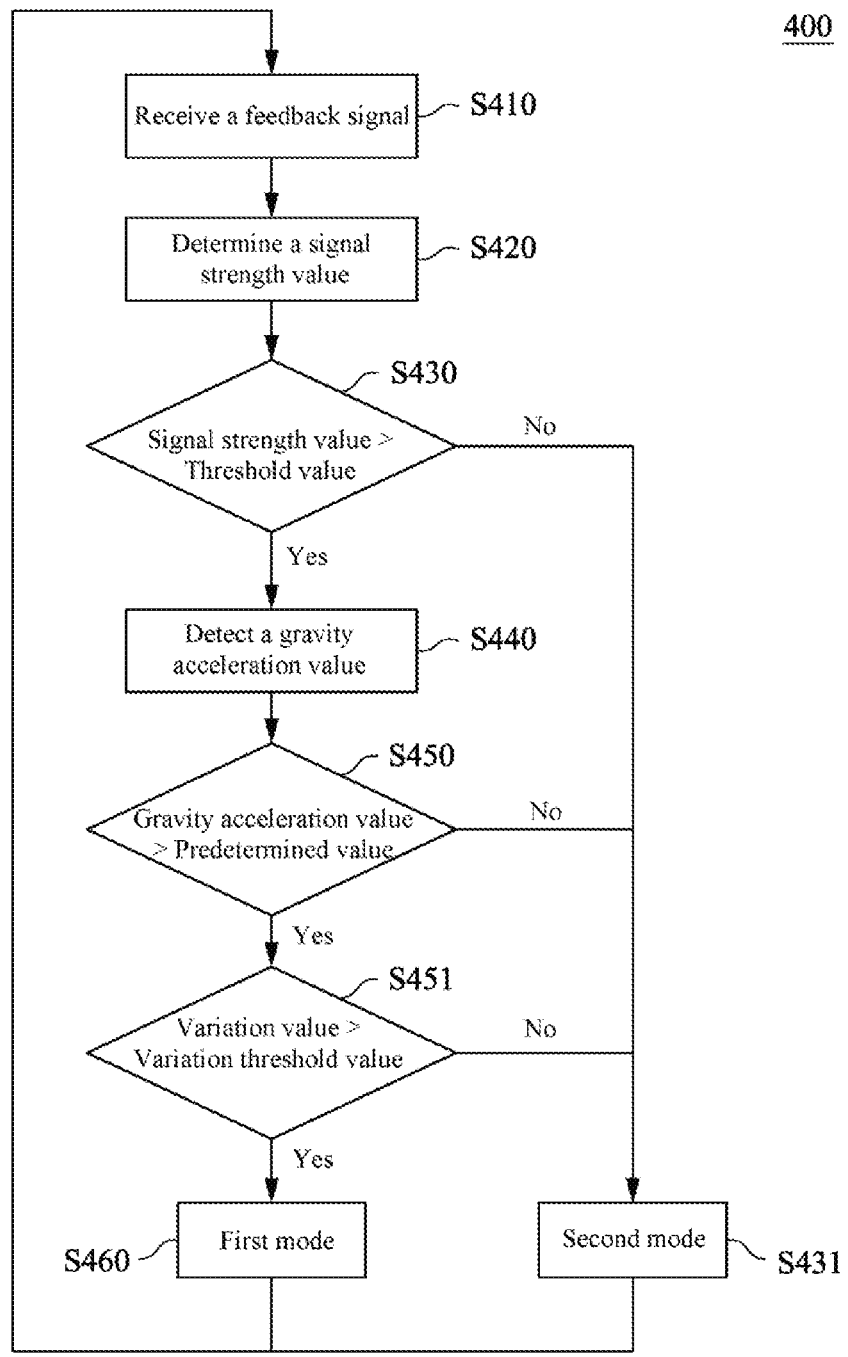
FIG. 4 is a flow chart of a screen control method according to some embodiments of the disclosure.

FIG. 4 is a flow chart of a screen control method 400 according to some embodiments of the disclosure. For ease of understanding, refer to the foregoing FIG. 1 to FIG. 3 together. In some embodiments, the screen control method 400 is applied to a call application of the electronic device 100 to achieve a power saving effect of a screen and avoid display abnormality.

In step S410, a feedback signal 240 is received. In an embodiment, after the transmitter 220 transmits an acknowledgement signal 230, the processor 110 receives the feedback signal 240 generated by the object 200 in response to the acknowledgement signal 230 from the receiver 210.

In step S420, a signal strength value of the feedback signal is determined. In an embodiment, the processor 110 determines the signal strength value of the feedback signal 240.

In step S430, the signal strength value is compared with a threshold value TH1. In an embodiment, when the signal strength value is greater than the threshold value TH1, it indicates that there is an object (a face or oil stain) close to the distance sensor 140 of the screen 130, and step S440 is performed. When the signal strength value is not greater than the threshold value TH1, it indicates that there is no object (a face or oil stain) close to the distance sensor 140 of the screen 130, and step S431 is performed. In step S431, the screen 130 is controlled to operate in a second mode, and step S410 is performed again.

In step S440, the gravity sensor 150 detects a current gravity acceleration value of the electronic device 100.

In step S450, the processor 110 first obtains the gravity acceleration value from the gravity sensor 150 and obtains a predetermined value 310 from the memory 120. Then, the gravity acceleration value is compared with the predetermined value 310. In some embodiments, when the gravity acceleration value is greater than the predetermined value 310, step S451 is performed. In some embodiments, when the signal strength value is greater than the threshold value TH1 and the gravity acceleration value is not greater than the predetermined value 310, step S431 is performed. In step S431, the screen 130 is controlled to operate in a second mode, and step S410 is performed again. In this embodiment, when the signal strength value is greater than the threshold value TH1 but the gravity acceleration value is not greater than the predetermined value 310, it indicates that although an object is close to the screen 130, the electronic device 100 is actually not held close to a face or an ear to make a call. In this embodiment, the processor 110 determines that the object close to the screen 130 is possibly foreign matter or oil stain, and then performs step S431.

In step S451, the processor 110 first obtains a variation threshold value TH2 from the memory, and determines whether a variation value Δg of the gravity acceleration value detected within a continuous time interval is greater than the variation threshold value TH2. If yes, the processor 110 determines that the electronic device 100 is held close to a face or an ear to make a call. In this case, step S460 is performed.

In another embodiment, when the signal strength value is greater than the threshold value TH1 and the gravity acceleration value is greater than the predetermined value 310, but the variation value of the gravity acceleration value detected within a time interval T is not greater than the variation threshold value TH2, it indicates that there is an object close to the screen 130, and the electronic device 100 may be placed on the holder obliquely to make a call but is not held close to a face or an ear for a call. In this embodiment, the processor 110 determines that the object close to the screen 130 is possibly a foreign matter or an oil stain, and then performs step S431. In step S431, the screen 130 is controlled to operate in a second mode, and step S410 is performed again.

In step S460, the screen 130 is controlled to operate in a first mode. As described above, because the electronic device 100 determines that the object closing to the screen 130 is a face or an ear, it indicates that the user is holding a phone to make a call. The processor 110 switches the screen 130 to the first mode, and continues to perform step S410.

In an embodiment, the first mode is a screen power saving mode used for reducing power consumed currently by the screen 130. In an embodiment, when the screen 130 operates in the first mode, the light source of the screen 130 is directly turned off, or luminance of the screen 130 is decreased.

In step S431, the screen 130 is controlled to operate in a second mode, and step S410 is performed again.

In some embodiments, the second mode is a normal operation mode for turning on the light source of the screen 130 to display an image, or increasing the luminance of the screen 130 to facilitate the user's viewing. In some embodiments, a first operation power consumed by the screen 130 operating in the first mode is lower than a second operation power consumed by the screen 130 operating in the second mode.

The foregoing steps in the screen control method 400 are only used as an embodiment, and are not limited to being performed according to a sequence in this embodiment. Without violating the steps and ranges of the embodiments of the disclosure, the steps in the screen control method 400 are properly added, replaced, omitted, or performed in different sequences.

In some embodiments, the screen control method 400 is implemented as at least one computer program instruction that is stored in a non-transient computer-readable medium. In an embodiment, the screen control method 400 is implemented by hardware, software, firmware, or any combination thereof. In an embodiment, the screen control method 400 is conducted by at least one of hardware or firmware for a better speed and accuracy performance. Alternatively, the screen control method 400 is conducted by software for more flexible design. The foregoing implementations are merely embodiments, and the disclosure is not limited thereto.

In conclusion, the control method for the electronic device and the screen provided in the embodiment of the disclosure avoid foreign matter or oil stain from interfering with the display function of the screen, so that the electronic device maintains a normal display behavior.

Although the disclosure is described with reference to the above embodiments, the embodiments are not intended to limit the disclosure. Any person skilled in the art may make variations and improvements without departing from the spirit and scope of the disclosure. Therefore, the protection scope of the disclosure should be subject to the appended claims.

What is claimed is:

1. An electronic device, comprising:
   a screen;
   a distance sensor, configured to transmit an acknowledgement signal, and receive a feedback signal responding to the acknowledgement signal;
   a gravity sensor, configured to detect a gravity acceleration value;
   a memory, configured to store at least one program instruction, a threshold value, a variation threshold value, and a predetermined value; and
   a processor, electrically connected to the distance sensor, the gravity sensor, and the memory, and loading the at least one program instruction to perform the following steps:
   receiving the feedback signal from the distance sensor;
   determining a signal strength value of the feedback signal;
   comparing the signal strength value with the threshold value obtained from the memory;
   comparing the gravity acceleration value obtained from the gravity sensor with the predetermined value obtained from the memory when the signal strength value is greater than the threshold value;
   comparing a variation value of the gravity acceleration value with the variation threshold value obtained from the memory when the gravity acceleration value is greater than the predetermined value; and
   controlling the screen to operate in a first mode when the variation value is greater than the variation threshold value;
   wherein the processor controls the screen to operate in a second mode when the signal strength value is greater than the threshold value but the gravity acceleration value is not greater than the predetermined value, and the second mode is different from the first mode.

2. The electronic device according to claim 1, wherein the processor controls the screen to operate in a second mode when the signal strength value is not greater than the threshold value, and the second mode is different from the first mode.

3. The electronic device according to claim 2, wherein a first operation power consumed by the screen in the first mode is lower than a second operation power consumed by the screen in the second mode.

4. The electronic device according to claim 1, wherein the processor controls the screen to operate in the second mode when the signal strength value is greater than the threshold value and the gravity acceleration value is greater than the predetermined value but the variation value of the gravity acceleration value is not greater than the variation threshold value.

5. The electronic device according to claim 1, wherein the distance sensor comprises an infrared transmitter, the acknowledgement signal is an infrared signal, and the infrared transmitter is configured to transmit the infrared signal.

6. A control method, applied to an electronic device with a screen, a memory, and a gravity sensor, wherein the memory is configured to store a threshold value, a predetermined value, and a variation threshold value, the gravity sensor is configured to detect a gravity acceleration value, and the control method comprises:
   receiving a feedback signal;
   determining a signal strength value of the feedback signal;
   comparing the signal strength value with the threshold value obtained from the memory;
   comparing the gravity acceleration value obtained from the gravity sensor with the predetermined value obtained from the memory when the signal strength value is greater than the threshold value;
   comparing a variation value of the gravity acceleration value with the variation threshold value obtained from the memory when the gravity acceleration value is greater than the predetermined value; and
   controlling the screen to operate in a first mode when the variation value is greater than the variation threshold value;
   wherein the screen is controlled to operate in a second mode when the signal strength value is greater than the threshold value but the gravity acceleration value is not greater than the predetermined value, and the second mode is different from the first mode.

7. The control method according to claim 6, further comprising:
   controlling the screen to operate in a second mode when the signal strength value is not greater than the threshold value, wherein the second mode is different from the first mode.

8. The control method according to claim 7, wherein a first operation power consumed by the screen in the first mode is lower than a second operation power consumed by the screen in the second mode.

9. The control method according to claim 6, wherein the screen is controlled to operate in the second mode when the signal strength value is greater than the threshold value and the gravity acceleration value is greater than the predetermined value but the variation value of the gravity acceleration value is not greater than the variation threshold value.

* * * * *